US011918997B2

(12) United States Patent
Vistisen et al.

(10) Patent No.: US 11,918,997 B2
(45) Date of Patent: Mar. 5, 2024

(54) SAMPLING DEVICE, A SYSTEM COMPRISING THE SAMPLING DEVICE AND A METHOD

(71) Applicant: Foss Analytical A/S, Hilleroed (DK)

(72) Inventors: Rasmus Vistisen, Hilleroed (DK); Jakob Frederik Schoendorff Engell, Hilleroed (DK)

(73) Assignee: FOSS Analytical A/S, Hilleroed (DK)

( * ) Notice: Subject to any disclaimer, the term of this patent is extended or adjusted under 35 U.S.C. 154(b) by 407 days.

(21) Appl. No.: 17/270,990

(22) PCT Filed: Aug. 7, 2019

(86) PCT No.: PCT/IB2019/056707
§ 371 (c)(1),
(2) Date: Feb. 24, 2021

(87) PCT Pub. No.: WO2020/058781
PCT Pub. Date: Mar. 26, 2020

(65) Prior Publication Data

US 2021/0213443 A1 Jul. 15, 2021

(30) Foreign Application Priority Data

Sep. 21, 2018 (DK) ............................ PA201800617

(51) Int. Cl.
*B01L 3/00* (2006.01)
*B01L 3/02* (2006.01)

(52) U.S. Cl.
CPC ............ *B01L 3/5021* (2013.01); *B01L 3/021* (2013.01); *B01L 2200/025* (2013.01);
(Continued)

(58) Field of Classification Search
CPC .. B01L 3/5021; B01L 3/021; B01L 2200/025; B01L 2200/026;
(Continued)

(56) References Cited

U.S. PATENT DOCUMENTS

| | | | |
|---|---|---|---|
| 5,244,635 | A | 9/1993 | Rabson et al. |
| 6,342,183 | B1 | 1/2002 | Lappe et al. |
| 2014/0349388 | A1 | 11/2014 | Dorian et al. |

FOREIGN PATENT DOCUMENTS

| | | | |
|---|---|---|---|
| EP | 0272915 A2 | 6/1988 | |
| WO | WO-2010026911 A1 | 3/2010 | |

(Continued)

OTHER PUBLICATIONS

International Search Report PCT/ISA/210 for International Application No. PCT/IB2019/056707 dated Nov. 4, 2019.

(Continued)

*Primary Examiner* — Jill A Warden
*Assistant Examiner* — Alex Ramirez
(74) *Attorney, Agent, or Firm* — Harness, Dickey & Pierce, P.L.C.

(57) ABSTRACT

A sampling device comprises a receptacle having an inner material receiving space defined by a side wall portion and a bottom wall portion and having a receptacle opening; and a sample container being adapted to close the receptacle opening when collocated with the receptacle. The sample container includes: a sample receiving portion which, when collocated with the receptacle is located in liquid communication with the inner material receiving space; a sample well positioned radially outside of the sample receiving portion in a direction perpendicular to a longitudinal axis, the sample well having a well opening; a liquid passageway for directing liquid from the sample receiving portion towards the well opening; a container having a container (Continued)

opening; and a liquid impermeable barrier for preventing liquid entering the container opening from the sample receiving portion).

19 Claims, 3 Drawing Sheets

(52) U.S. Cl.
CPC . *B01L 2200/026* (2013.01); *B01L 2200/0689* (2013.01); *B01L 2300/0681* (2013.01); *B01L 2400/0409* (2013.01)

(58) Field of Classification Search
CPC ..... B01L 2200/0689; B01L 2300/0681; B01L 2400/0409
See application file for complete search history.

(56) References Cited

FOREIGN PATENT DOCUMENTS

| | | | | |
|---|---|---|---|---|
| WO | WO-2016149253 A1 * | 9/2016 | | .............. B01L 3/502 |
| WO | WO-2018055432 A1 | 3/2018 | | |

OTHER PUBLICATIONS

Written Opinion of the International Searching Authority PCT/ISA/237 for International Application No. PCT/IB2019/056707 dated Nov. 4, 2019.
Danish Search Report for Danish Patent Application No. PA 2018 00617 dated Mar. 14, 2019.

* cited by examiner

SAMPLING DEVICE, A SYSTEM COMPRISING THE SAMPLING DEVICE AND A METHOD

CROSS-REFERENCE TO RELATED APPLICATIONS

This application is a national phase under 35 U.S.C. § 371 of PCT International Application No. PCT/IB2019/056707, which has an International filing date of Aug. 7, 2019, which claims priority to Danish Application No. PA201800617, filed Sep. 21, 2018 in the Danish Patent and Trademark Office, the entire contents of each of which are hereby incorporated by reference.

BACKGROUND

The present invention relates to a sample container and especially a sample container configured to be rotated to separate a sample and derive a fraction for use in a further process, where an analyte or liquid/fluid/surface in another container, provided in the sample container, is used.

Sample handling of this type may be seen in EP0272915 and WO2010/026911, the contents of which are incorporated herein by reference.

SUMMARY

In a first aspect, the invention relates to a sampling device comprising a receptacle and a sample container; the receptacle having an inner material receiving space defined by a side wall portion, a bottom wall portion at a first end of the receptacle and having a receptacle opening opposite the bottom wall portion in a second end of the receptacle opposite the first end; and the sample container being adapted to overlay the receptacle opening when collocated with the receptacle, the sample container including:

- a sample receiving portion which, when the sample container is collocated with the receptacle, is located in liquid communication with the inner material receiving space,
- a sample well positioned radially outside of the sample receiving portion in a direction perpendicular to a longitudinal axis passing through the first end and the second end of the receptacle, the sample well having a well opening,
- a liquid passageway extending from a first opening into the sample receiving portion to a second opening into the well opening,
- a container having a container opening; and
- a liquid impermeable barrier adapted to prevent liquid entering the container opening from the central, sample receiving portion.

In some embodiments the sample container may be adapted to provide a permanent closure of the receptacle opening and in other embodiments the sample container may be adapted to provide a temporary closure over the receptacle's open top. The latter embodiments have advantages that a single receptacle may be produced that can be employed for different purposes depending on the type of sample container with which it is collocated, this may reduce manufacturing costs of the receptacle; also the receptacle may be reusable, thus reducing cost of ownership.

The container opening may be permanently open or may be initially overlaid and closed by the liquid impermeable barrier. In the latter embodiments the liquid impermeable barrier may be constructed of a frangible material which, when broken, permits access to the container.

The container may comprise components or analytes which are desired for affecting the sample. Thus, the container may contain therein analytes or other components, such as reactive surfaces or beads, for performing e.g. a chemical reaction in or with the sample or otherwise converting the sample or a portion thereof before any further reaction involving the container, as described below.

The receptacle has a bottom and side walls which are configured into an inner material receiving space to hold material which is to be sampled. The material is often a liquid or a suspension but may also be a gas, gel or other flowable material. The receptacle is usually made of a material or a material composition which does not alter, convert, absorb or leak the material which is to be sampled, if this is not directly desirable. The receptacle may if desired comprise a preservative, such as if the material to be sampled is easily degradable or if it is expected that the material to be sampled will be stored in the receptacle for a long time.

As will be described below, the sample container may also comprise a filter and/or seal disposed to cover at least a section of the sample receiving portion. This filter and/or seal may advantageously prevent spilling of the material to be sampled and/or of other material located in the receptacle. The filter may be used for separating the material to be sampled into a filtered fraction which forms the sample allowed to reach the well and another fraction retained in the receptacle.

The sample container in some embodiments comprises a material receiving bore in communication with the receptacle which, in some of these embodiments, is uncovered by any filter and/or seal.

The sample well is configured to hold at least a portion of the fluid which passes through the sample receiving portion to form the sample and has a well opening. The well opening and the sample receiving portion may be located in a direction radially perpendicular to the longitudinal axis which passes through the open top and the bottom wall portion of the receptacle, the well and/or the well opening is then positioned radially outside of the sample receiving portion or, more generally stated, the well opening is located closer to an outer periphery of the sample container than is the sample receiving portion.

The present sampling device is especially suited for rotation around the longitudinal axis for separating the material to be sampled to derive a fraction which is forced upwardly through the sample receiving portion to form a sample, a portion of which enters the well via the passageway. Naturally, the material in the receptacle need not have different fractions with different densities, for example, so that a portion, merely, of the material is forced upwardly to form the sample, that portion being identical to the material remaining in the receptacle.

In other embodiments the inner material receiving space is adapted to provide a variable volume, the reduction thereof, such as by squeezing it or by moving the bottom wall section thereof towards the open top, then causes the flowable fluid in the receptacle to move towards and through the sample receiving portion of the sample container. In some embodiments more fluid, for example a gas, could be added to reduce the volume available to the flowable fluid material and thereby achieve the same movement effect. In the foregoing embodiments the relative longitudinal positions L1 and L2 (positions projected along the longitudinal axis) of the sample receiving portion (14) and the sample well (18) are selected so that the fluid from the receptacle, forced upwardly and radially, leaves the sample receiving portion and some of it enters the sample well to form a sample. Then, the sample receiving portion may extend farther radially than the sample well, as long as the well opening is positioned correctly.

As described, and referring to FIGS. 1, 2, and 5, a liquid passageway (16) is provided extending from a first opening (10) into the sample receiving portion (14) to a second opening (20) into the well opening (18*o*) of the sample well (18). The first opening (10) may be the opening (14*o*) into the sample receiving portion (14), such as if the liquid is simply forced out of the sample receiving portion (14). Alternatively, the liquid passageway (16) may be dedicated channel for moving the sample (portion) to the well opening (18*o*) and into the sample well (18), whereby it may have a separate, first, opening (10) into the sample receiving portion (14). Similarly, the second opening (20) into the well opening (18*o*) may be the well opening (18*o*) per se or a dedicated opening from the passageway (16) into the well (18).

In some embodiments the first opening is positioned closer to a top portion than a bottom portion of the sample receiving portion.

During rotation, or during any of the volume reducing steps mentioned above, the material in the receptacle or a portion thereof is forced, typically radially outwardly and thus, upwardly against the direction of gravity and along the inside wall portions of the receptacle in a direction parallel to the longitudinal axis. The material then reaches the sample receiving portion, passing through it to form a sample, then to the first opening and is guided by the passageway to the second opening and into the sample well. Then, rotation/volume reduction may be stopped, so that a portion of the sample is now in the sample well.

In order to be well suited for the liquid level rising when rotating, the side wall portion of the receptacle may be formed with the walls essentially parallel to the longitudinal axis, such as with a less than 5 degrees deviation from a direction parallel to the axis, so that the liquid movement during rotation is well behaved and easily controllable.

In some embodiments, and referring to FIGS. 4 and 5, the sample receiving portion (14) may be positioned at a first position (L1) projected onto the longitudinal axis (A), the well opening (18*o*) at a second longitudinal position (L2) projected onto the longitudinal axis and the container opening at a third longitudinal position (L3) projected onto the longitudinal axis, the third position (L3) being above the first and the second positions (L1 and L2) in a direction along the longitudinal axis going from the bottom wall portion to the open top. Thus, when the liquid level increases, the liquid may be elevated to reach the second position (L2) and thus enter the well (18), without the liquid reaching the third position (L2) and thus is able to enter the container (20). The material forming the sample container in which the sample well and the container are formed then provides the liquid impermeable barrier preventing liquid entering the container from the sample receiving portion.

In fact, in addition or alternatively, the container may be sealed by the liquid impermeable barrier, which may be separate from the material comprising the sample container in which the sample well and the container are formed, to prevent liquid from entering the container before this is desired.

Naturally, multiple wells may be provided. This may e.g. be to increase a volume of sample contained by the sample container.

In some embodiments, the receptacle may be oval in cross section, so that the sample liquid is primarily forced upwardly in the portions the farthest from the centre (at the major axis). Then, one or more sample wells may be provided at these portions.

The container may comprise an analyte, chemical substance, a reactive surface, or the like. The contents of the container thus may be used for creating a reaction with some or all of the sample comprised in the sample well(s). A portion of the contents of the container may be provided in the sample well(s), or vice versa. The sample well(s) and/or container may have a predetermined volume in general or a predetermined volume or quantity of the sample or analyte/chemical substance/surface, so that a controlled reaction may take place.

Naturally, multiple containers may be provided in order to increase the number of reactions or chemical reaction steps which the sample may be exposed to.

In one embodiment:

the well opening, when projected on to a plane perpendicular to the longitudinal axis, is positioned between a first, minimum distance to the axis and a second, maximum distance to the axis, and the container opening is positioned, in the plane, between a third, minimum distance to the axis and a fourth, maximum distance to the axis, the interval defined by the first and second distances having an overlap with the interval defined by the third and fourth distances.

In this manner, a pipette, for example, may enter both the sample well and the container without having to alter its distance to the axis. In one example, the pipette or other dosing element may be movable only along the axis, where the sample container may be rotatable around the axis. Then, the pipette or other dosing element may enter both the sample well and the container merely by rotating the sample container and moving the pipette up and down along the axis.

Preferably, the second opening opens into a top portion of the sample well. Alternatively, the second opening may be provided at a lower position than the first opening. In this manner, the liquid will stay in the sample well, when the sample container is stationary.

In one embodiment, the sample container further comprises an opening, preferably located centrally with the longitudinal axis, from outside of the sample container to the receptacle. Preferably, this central opening comprises a bore extending along a predetermined distance parallel to the axis, such as to terminate above the first and second distances, so that when rotated, the liquid, as it is forced radially outwards, will not exit from this bore. Thus, an edge may be provided between outer portions of the central opening and outer portions of the inner surface of the sample receiving portion, so that when forced outwardly, the liquid may reach this edge which may prevent the liquid from exiting the sample receiving portion. In an alternative, a filter may be provided at this position to filter the liquid leaving the sample receiving portion. This position of the central opening prevents the liquid from leaving the sample receiving portion unfiltered.

As mentioned, preferably, a component, for example an analyte, is present in the container. This component may be selected, based on the sample type, to perform a predetermined reaction, to make a sample preparation or to otherwise affect the sample in a desired manner. The component thus may act to, with the sample added thereto, result in a sample which is ready for, for example, a particular quantification or measurement.

In one embodiment, the sample container further comprises a sealing element, typically acting as the liquid impermeable barrier, sealing at least the container. In this manner, the contents of the container cannot escape neither can the container be contaminated.

This seal may then be removed or pierced in order to remove liquid/analyte from the container or in order to add sample from the sample well thereto.

The seal may also cover e.g. the well and/or the passageway in order to prevent sample from escaping during rotation and to guide the sample from the central sample receiving portion to the well. Then, the seal over the well may be broken or removed in order to gain access to the sample therein.

In one embodiment, the sample container further comprises an elongate channel comprising an elongate sampling element. The elongate sampling element may be an element exhibiting a change in a parameter depending on the presence or a concentration of a component of a liquid added thereto. A typical type of elongate sampling element is a dip stick or lateral flow device, such as an element comprising at least a portion capable of transporting liquid therein by capillary forces. Alternatively, liquid may be transported into the channel using a pump. Capillary forces may be created when the elongate sampling element comprises a woven or non-woven portion. Many alternatives exist, such as paper-like materials or hydrophilic or lipophilic materials or the like—depending on the sample or liquid type to be transported. This portion may then comprise therein or thereon a chemical substance causing a reaction visible to an observer or to a measuring instrument. This portion capable of transporting liquid preferably exists all along the length of the elongate sampling element, such as if the elongate sampling element was made of such material.

The elongate sampling element, or a portion thereof or a material held thereby, may be capable of changing a colour, or another optical property, such as an absorption, transmission, reflection or another parameter which may be detected optically, such as when forming a chemical bond, the vibration thereof may be detected.

Other detectable parameters may be detected electronically, such as by a current generated or a current transported through the elongate sampling element. The sample container may comprise electrodes capable of feeding a current to or through the elongate sampling element.

In addition or alternatively, the sample container may comprise a window or other radiation transmissive element between the channel and the surroundings so that a colour change may be ascertained or a reflection/absorption/scattering may be detected by feeding radiation to the elongate sampling and/or receiving radiation therefrom.

The elongate channel may be visible from a direction perpendicular to the longitudinal axis, such as if the elongate channel extends around the axis, or from a direction along the axis, such as if the elongate channel extends in a plane perpendicular to the axis, such as across an upper surface of the sample container.

The channel may be open, so that the elongate sampling element may be provided therein, removed therefrom or replaced therein. Alternatively, the channel may be sealed to prevent degradation, contamination or loss of the elongate sampling element.

In one embodiment, the elongate channel opens into the container. In this manner, the liquid in the container may flow into the channel and thus wet the elongate sampling element. The liquid transporting portion of the elongate sampling element may transport the liquid along the length of the elongate sampling element from the opening. Then, the channel preferably is at least approximately the same longitudinal position, projected onto the axis, as the container. Alternatively, the channel may extend from an opening and downwardly so that gravity assists in transporting the liquid along the elongate sampling element.

Alternatively, the channel may open into the well, if the resulting liquid to be tested is present in the well. Clearly the same considerations apply.

In yet an alternative embodiment, the elongate channel may open into a second container. This second container may, as the first container, be configured so as to be incapable of receiving fluid from the sample receiving portion, the well or the passageway during normal operation. Thus, the second container may be empty, until liquid is added thereto, such as from the first container, such as after a chemical reaction in the first container has taken place. Alternatively, the second container itself may comprise further chemical compounds for performing additional reactions with the liquid before transmission into the channel and into the elongate sampling element.

The second container may have a predetermined volume to ensure that the amount of liquid reaching the elongate sampling element is well defined.

This second container may have an opening at least partly positioned within the above overlap of well opening and container opening, so that a pipette moving only up/down may also be able to transfer liquid to the second container.

Naturally, the second container and the oblong channel may be positioned above the central sample receiving portion, the well, the liquid passageway and even the first container, if desired.

In one embodiment, the sample container forms an attachable lid or closure of the sample receptacle. In this situation, different configurations of sample container may be provided for different types of samples, where the same sample receptacles may be provided in bulk. The different sample containers may then be provided with special purpose components in the containers, so that different sample containers may be used for different sample types or different types of measurement. Then, a selected sample container may be attached to a sample receptacle to be ready for a measurement. This attachment may be detachable or permanent. In the former adaption, sample receptacles may be reused if desired.

Thus, a second aspect of the invention relates to a sample container for use in the sampling device of the first aspect.

A third aspect of the invention relates to a system for handling a sample, the system comprising:

- a sampling device according to the first aspect of the invention,
- a rotator for rotating the sampling device, around the longitudinal axis, and
- a dispenser positioned so as to transfer an amount of material between the container and the sample well.

In this context, the rotator may be any type of rotating arrangement, such as an element for engaging the sampling device and a motor or the like for rotating the element. Clearly gears, bearings and the like may be provided if desired. Also, any type of motor may be provided as may any type of controlling and/or sensing for controlling the rotation.

The dispenser may be any type of dispenser, such as a liquid receiving element which may be introduced into or above a central container opening (or bore) when present, the sample well(s) and the container(s) in order to either deliver liquid/fluid or the like thereto or remove liquid/fluid or the like therefrom. The dispenser may comprise a pump or the like for transferring liquid or the like into the liquid receiving element and delivering the liquid therefrom. A reservoir may also be provided, if a liquid is desired delivered in a larger amount or to a number of sample containers.

The dispenser may be configured to pierce or penetrate a cover layer or seal, such as above the sample well(s), the container(s) or the central container opening.

Multiple dispensers may be provided. Thus, one dispenser may be used for dispensing into the central container opening and one dispenser may be used for transferring liquid between the sample well(s) and container(s). Multiple dispensers may be used if a swift operation is desired, or if the movement of dispensers is limited.

In one embodiment, the, or each, dispenser is at least translatable along a direction parallel to the longitudinal axis. This simplifies the overall dispenser or dispensing assembly, as only a linear movement is required. In this situation, the overlap between the radial positions of the openings of the sample well(s) and container(s) enables a single pipette to engage the well(s) and container(s).

A fourth aspect of the invention relates to a method of handling a sample, the method comprising:

- retaining a fluid material in the receptacle of a sampling device according to the first aspect of the invention,
- rotating the sampling device around the longitudinal axis so as to have a portion of the fluid material pass through the sample receiving portion and enter the sample well via the liquid passageway and
- transporting at least a portion of material between the container and the sample well.

Clearly, elements from all embodiments and aspects of the invention may be combined if desired.

As mentioned above, the sampling device may be designed so that when the rotation forces the liquid outwardly and upwardly, the liquid may enter the passageway and then the well.

A portion of the liquid in the well may be displaced to the container, or a portion of the substance of the container may be displaced to the well. This displacement may be performed using the above pipette, such as, if the relative positions of the well and container opening allow, a pipette moving only up and down.

One or more further containers may be provided, and a portion of a sample liquid from the sample well or from a first container may be dosed to a further container and liquid from that further container dosed into another further container and so on to have an(other) chemical reaction take place.

The above elongate channel may be provided with the elongate sampling element, so that liquid displaced thereto (via the first or second or further containers) may be transported into the elongate sampling element to cause a change which may then be determined by an observer or a measuring instrument. A colour change may be determined with the naked eye, for example, whereas a change in reflection or electrical properties may be determined by a measuring instrument.

A fifth aspect of the invention relates to a method of operating the system according to the third aspect of the invention, the method comprising:

- retaining a fluid material in the receptacle of the sampling device of the first aspect of the present invention,
- rotating the sampling device around the longitudinal axis so as to have a portion of the fluid material transported through the sample receiving portion and enter the sample well via the liquid passageway and
- operating the dispenser to transporting at least a portion of material between the container and the sample well.

Then, the same additional steps and elements may be provided and performed as described above.

As described above, the operating step may comprise:

- lowering a pipette of the dispenser into the sample well and withdrawing a portion of the liquid therefrom,
- raising the pipette,
- rotating the sampling device around the longitudinal axis to bring the container opening into longitudinal alignment with the container opening, and
- lowering the dispenser into the container and delivering a portion of the withdrawn liquid thereinto.

This simple movement is facilitated when the well and container openings have the above described overlap.

BRIEF DESCRIPTION OF THE DRAWINGS

In the following embodiments are described with reference to the drawings of the Figures, wherein.

Figure 1:
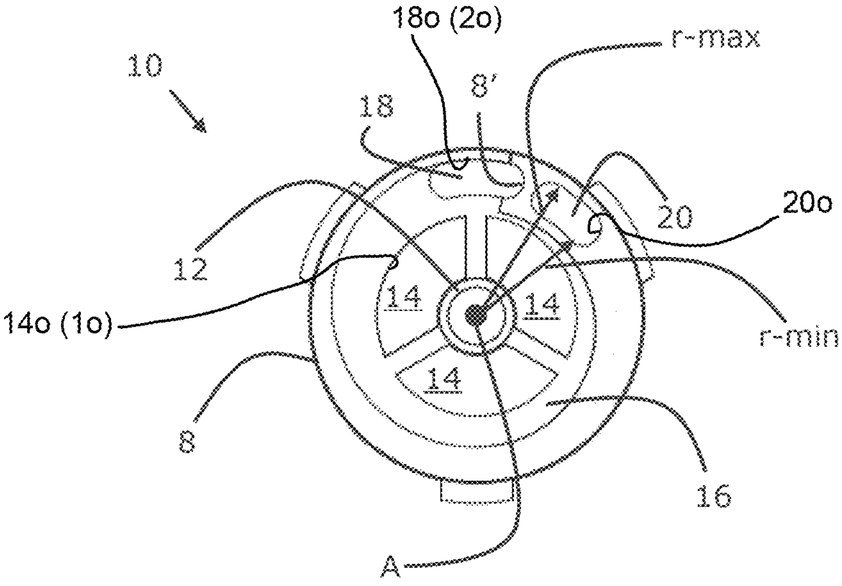
FIG. 1 illustrates a first embodiment of a sample container.

DETAILED DESCRIPTION in FIG. 1, a first embodiment of a sample container 10 is illustrated comprising annular body 8 formed with: a centrally located opening, here in the form of a bore 12; a sample receiving portion 14; a liquid passageway 16, here in the form of a collecting track, and a sample well 18. A container 20 is provided for holding a material. A longitudinal axis A through the centre of the sample container 10 is illustrated.

In general, the sample container 10 is configured to be rotated around the axis A so that a fluid, typically a liquid, present in a receptacle (not illustrated in this figure) below the sample container 10 is forced outwardly and thus upwardly through the sample receiving portion 14 and into the collecting track 16, which in the present embodiment flares outwardly away from the axis A to guide fluid from the sample receiving portion 14 towards the sample well 18 which will then collect at least some of the fluid that has entered the track 16.

Subsequently, the fluid from the sample well 18 and material from the container 20 may be mixed to arrive at a process or result which may then be quantified if desired.

A filter material (not shown in FIG. 1) may be provided to cover the sample receiving portion 14. Filtering may be desired if a liquid present below the sample receiving portion 14 is a suspension of a solid and a liquid, where the solid is not desired in the sample well 18.

The present sample container 10 may be used for a myriad of purposes, such as tests or measurements.

In other embodiments, the sample container 10 may itself comprise a measuring element. Multiple types of measuring elements or elements taking part in the measurement may be provided. In one example, the measuring element may be a window or the like opening into the well/container so that an optical measurement may be carried out without removing the liquid or the like from the well/container. Alternatively, electrodes may be provided in the container/well for performing the measurement.

Figure 2:
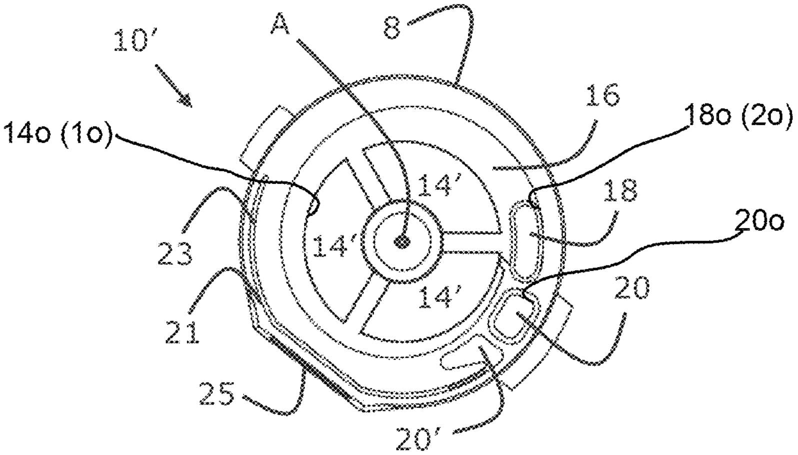
FIG. 2 illustrates a second embodiment of a sample container.

In FIG. 2, an embodiment of a sample container 10' is seen which, in addition to the sample container 10 of FIG. 1, has a second container 20' connected to an elongate channel, here an oblong channel 21. In the present embodiment the oblong channel 21 extends generally parallel to an outer circumferential wall of the body 8 and has a dimension in the direction of the longitudinal axis A. A dip stick or other oblong assay element provides an elongate sampling element 23 capable of transporting liquid from the container 20' along its length may be inserted into the elongate channel, here an oblong channel 21, to lie with a reactive surface generally parallel with the longitudinal axis A. As is known, the dip stick 23 further comprises one or more components located on the reactive surface which are configured to react with or to a component in the transported liquid. Dip sticks or the like may be used for illustrating a pH of the liquid as well as for identifying a large number of other components.

The dip sticks have at least a portion capable of transporting liquid usually due to capillary effect. Then, the liquid may be transported from the container 20' along the oblong channel 21 in a controlled manner. Clearly, the container 20' may be dimensioned to comprise a metered and controlled amount of liquid in order to ensure that the amount of liquid reaching the elongate sampling element 23 is controlled.

Often, dip sticks or the like change colour depending on the result of the reaction. The dip stick 23 then may be removed from the sample container 10' for ascertaining this colour change, or a window 25 may be provided so that the colour or colour change may be determined without removing this element from the sample container 10'.

A filter material 14' is provided in this embodiment and overlies the sample receiving portion 14 of the sample container 10'.

This embodiment then may be operated by transferring a portion of the liquid or other flowable material that has passed through the filter material 14' from the container 20 or sample well 18 to the container 20'. Alternatively, the container 20' may replace the container 20, so that any reaction desired may take place in the container 20'. Clearly, if a component of the resulting liquid in the container 20' is not desired in the elongate channel, here an oblong channel 21, a separate filter may be provided at the entrance into the oblong channel 21 from the container 20'

Figure 3:
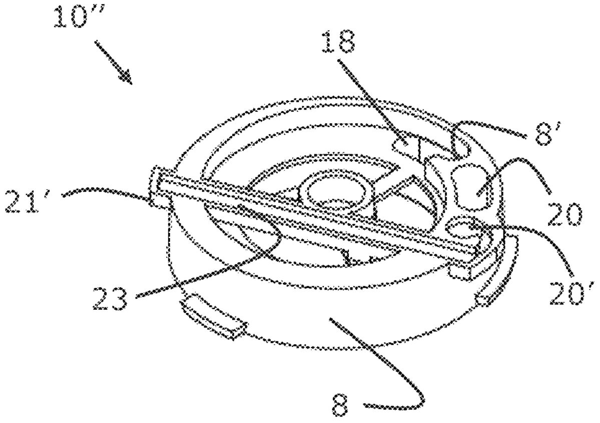
FIG. 3 illustrates a third embodiment of a sample container.

In FIG. 3, an alternative embodiment of a sample container 10" is illustrated in which the elongate sampling element 23 is provided in a horizontal plane in a horizontal tray 21' which provides the elongate channel again fed from the container 20'. In this manner, the distribution over the width of the element 23 may be more even, which may be seen as an advantage. Naturally, a window may be provided over the horizontal tray 21' and the element 23 in order to keep the element in place during rotation and to e.g. increase the shelf life of the sample container 10".

Usefully, the top of the sample container 10, 10', 10" is sealed, such as by a polymer/plastic layer in order to prevent contamination thereof. The seal then may seal the opening 20*o* into the container 20 while allowing liquid access from the upper side of the sample receiving portion 14 and to the sample well 18. Additionally or alternatively the container 20 may be provided with a seal to act as a liquid impermeable barrier in order to prevent loss, such as by evaporation, of any contents thereof which, in use, are intended to be reacted with sample from the sample well 18 and to prevent liquid in the sample well 18 entering the container 20. The seal is made penetrable, for example by a pipette, such as by having a sufficiently small layer thickness. The bore 12 may also be sealed in order to prevent ingress of unwanted material.

Figure 4:
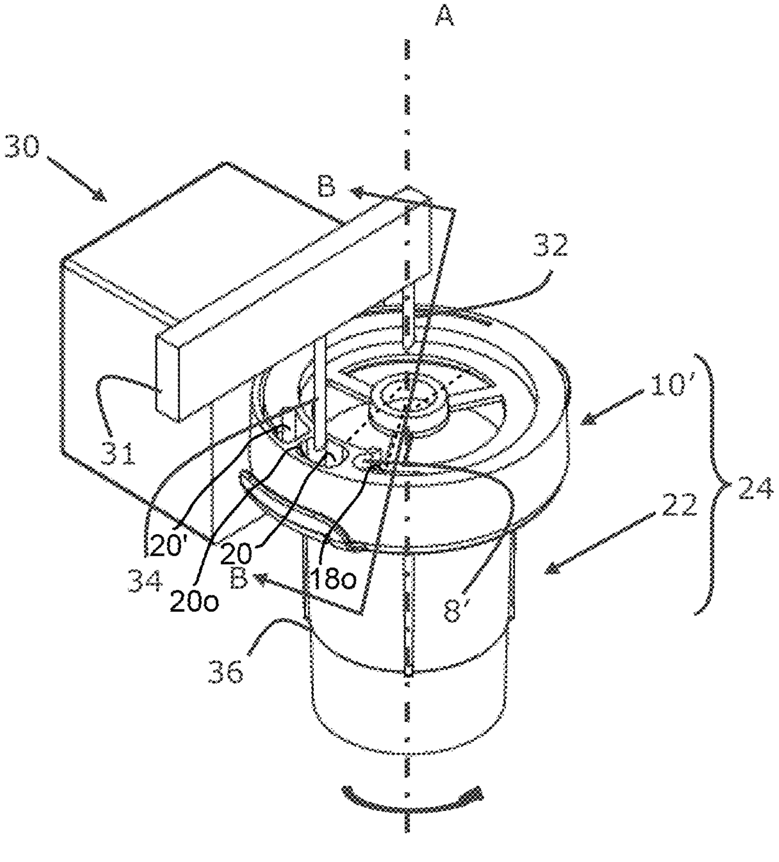
FIG. 4 illustrates an assembly comprising a sampling device according to the present invention.
Figure 5:
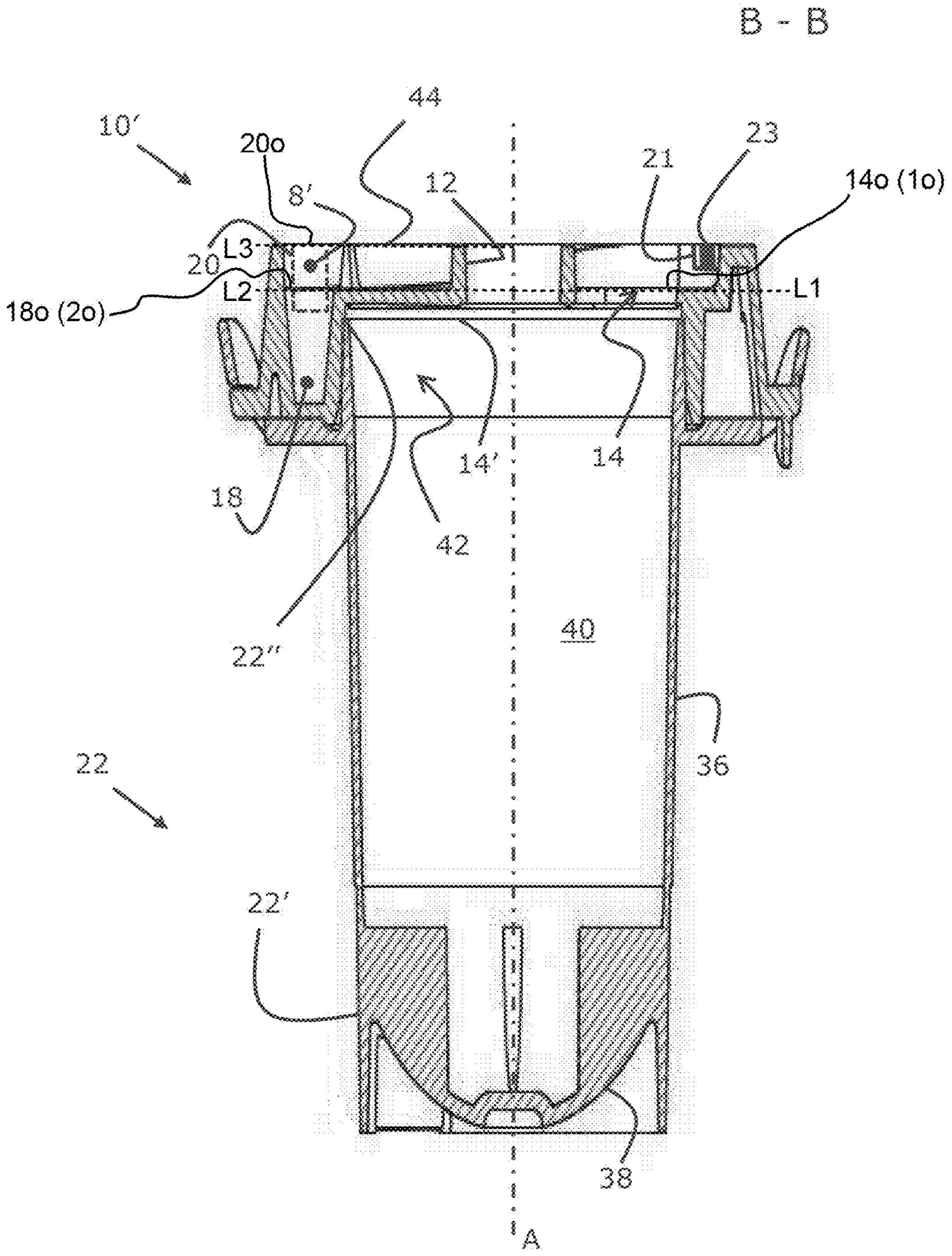
FIG. 5 illustrates a cross sectional view of the sampling device of FIG. 4.

As shown in FIGS. 4 and 5, an upper opening (well opening 18*o*) of the sample well 18 (positioned at a second longitudinal position L2) may be positioned below (when the axis A is vertical) the opening 20*o* into the container 20 (the opening 20*o* positioned at a third longitudinal position L3), so that a stepped portion 8' of the body 8 which separates the two openings (20*o* and 18*o*) acts as a liquid impermeable barrier to prevent liquid in the sample well 18 entering the container 20.

In addition, it is preferred that the sample container 10, 10', 10" has no openings from below and into the track 16, well 18 and container 20. In fact, it may be preferred that the sample container 10, 10', 10" has no liquid passages from its lower side to the upper side at positions farther from the axis A an outer radius of the filter 14'. In this manner, the liquid entering the space over the sample receiving portion 14 has passed through the filter 14'.

If the filter is left out, the spinning of the liquid in the bore 12 or receptacle 22 may still provide any desired filtering (now based only on density), so that only the desired liquid enters the track 16 and well 18 and not the container 20.

Preferably, the container 20 is accessible only from the upper side of the sample container 10, 10', 10".

In FIG. 4, the sample container 10' forms a lid collocated with a receptacle 22 for receiving the liquid and together constitute a sampling device 24 according to the present invention.

As discussed previously, many different sample containers or lids 10, 10', 10" may then be designed. The filter 14' may be left out if desired, and different numbers of containers 20 or sizes of containers 20 may be provided as may different contents of the container(s) 20. As mentioned, the container(s) 20 may comprise a liquid, a powder, pellets, gas, reactive surfaces or the like. The contents of the container 20 may be metered to a particular amount if desired.

Then, sample containers 10, 10', 10" may be provided for a wide range of liquids, samples or the like and may be configured to different types of processes or reactions. Clearly, the same receptacle 22 or the same shape thereof may be used for a number of different sample containers or lids 10, 10', 10".

In FIG. 4, the sampling device 24 is illustrated together with a dosing apparatus 30 comprising two pipettes or needles 32 and 34, provided on a pipette boom 31, where the pipette 32 is positioned directly above the central bore 12, such as on the longitudinal axis A, in order to dispense a liquid into the central bore 12 for transfer into the receptacle 22. The pipette 34 is positioned above the container 20 but may also be positioned above the well 18, if the sampling device 24 is rotated around the axis A (solid arrow). A rotator, such as a rotatable motor, (not illustrated) may be provided for rotating the sampling device 24 around the axis A, which preferably is a symmetry axis of the sampling device 24. When spinning the sampling device 24 in order to urge material within the inner material receiving space 40 upwards along an inner surface of side wall portion 36 by means of centrifugal force rotation speeds of several thousand revolutions per minute may be required. It is very useful then if the centre of mass of the sampling device 24 is located along the longitudinal axis A.

The pipette boom 31 may be translated upwardly and downwardly, such as along the longitudinal axis A, which normally, at least during rotation, is vertical. This simple translation and rotation nevertheless will allow the two pipettes 32,34 to both transfer liquid to the bore 12 as well as transfer liquid or the like between the sample well 18 and container 20.

Thus, it is desired that the sample well 18 and the container 20 may be engaged by the same pipette 34 simply by rotating the sampling device 24 around the longitudinal axis A. Thus, the container 20 and sample well 18 should be accessible at the same distance from the axis A. In FIG. 1, the minimum and maximum radius—r-min and r-max—are illustrated at which the container 20 may be accessed. The same constraints will clearly be true for similar access to any container 20' connected to the elongate channel provided by oblong channel 21 or horizontal tray 21'. The sample well 18, in FIG. 1, also extends between r-min and r-max, but this is not a requirement. Other r-min and r-max distances may be selected for the well, as long as the intervals defined by the r-max and r-min values for the container(s) 20, 20' and sample well 18 have an overlap, which is a distance from the axis A at which both may be accessed preferably from directly above.

As described above, any resulting liquid or the like from the container 20 or sample well 18 may be used for a measurement or a determination of properties thereof. Then, that liquid or the like may be transferred from the well/container to a measuring instrument if desired.

A liquid dispensed via bore 12 into the receptacle 22 may be the liquid desired in the sample well 18 or may be one component of a liquid to be tested. The liquid in the receptacle 22 may be arrived at by e.g. mixing a liquid and another fraction, which may be solid, fluid, liquid or a mixture thereof, to the liquid to allow the mixture to react, if required. In one example an extracting liquid is added to a cereal powder, which is the actual element to be tested, such as through the bore 12 via the pipette 34, which extracting liquid is selected to extract a component of interest from the powder. Having allowed the extraction to take place, a portion of the resulting liquid will, when spinning the sampling device 24 around the axis A, pass through the sample receiving portion 14 via the filter 14' and arrive in the sample well 18, leaving the powder on the other side of the filter 14'. In some uses it is envisaged that the sample container (10' say) and the receptacle 22 are initially separate. The cereal powder to be tested is placed into the receptacle 22 and the sample container 10' collocated therewith to close the receptacle 22. The so assembled sampling device 24 is then placed in the dosing apparatus, the extraction liquid dispensed into the receptacle 22 from the pipette 32 via the bore 12, and the sampling device 24 rotated rapidly around the longitudinal axis A.

In FIG. 5, the sampling device of FIG. 4 can be seen in cross section along B-B. The receptacle 22 has a side wall portion 36 and a bottom wall portion 38 at a first end 22' of the receptacle 22 that together define an inner material receiving space 40 and terminates with a receptacle opening 42 at a second end 22' opposite the first end 22', here provided as an open top opposing the bottom wall portion 36. The longitudinal axis A passes centrally in a direction end to end 22',22" between the bottom wall portion 38 and the open top 42.

The entire top of the sample container 10' is, in the present embodiment, sealed by a seal 44 such as by a polymer/plastic layer which can, in some cases act to prevent contamination thereof. The seal 44 then provides a liquid impermeable barrier covering the opening **20*o* into the container 20 and the bore 12 while allowing liquid access from the upper side of the sample receiving portion 14 and to the sample well 18. In other embodiments the seal 44 may cover only the opening 20*o* of the container 20 in order to prevent loss, such as by evaporation, of any contents thereof which, in use, are intended to be reacted with sample from the sample well 18 and to prevent liquid in the sample well 18 entering the container 20. The bore 12 may in some embodiments also be similarly sealed in order to prevent ingress of unwanted material. Indeed the seal 44 may be designed to selectively cover only any one or more openings provided in the sample container. The seal 44, at least above the opening 20*o* into the container 20 (or other opening(s) where access from external the sample container 10'** is desired) is made penetrable, for example by a pipette, such as by having a sufficiently small layer thickness.

The sample container (10' say) closes the open top 42. As can be seen, the body 8 of the sample container 10' houses the sample well 18; container 20 and the oblong channel 21 in which is located the oblong sampling element 23 and is here formed as an annulus (thick ring) to provide a central through hole which acts as the sample receiving portion 14.

The invention claimed is:

1. A sampling device, comprising:

a receptacle, the receptacle including a side wall structure and a bottom wall structure at a first end of the receptacle, the side wall structure and the bottom wall structure collectively defining an inner material receiving space within the receptacle and a receptacle opening at a second end of the receptacle opposite the first end; and a sample container configured to overlay the receptacle opening when collocated with the receptacle, the sample container including a body defining a sample receiving portion configured to be located in liquid communication with the inner material receiving space of the receptacle based on the sample container being collocated with the receptacle, a sample well that is radially further than the sample receiving portion from a longitudinal axis in a direction that is perpendicular to the longitudinal axis, wherein the longitudinal axis passes through the bottom wall structure and the receptacle opening, wherein the sample well has a well opening, a liquid passageway extending from a first opening into the sample receiving portion to a second opening into the well opening, and a container having a container opening, wherein the body includes a portion that is configured to act as a liquid impermeable barrier to prevent liquid entry into the container opening from the sample receiving portion, wherein the body defines the sample receiving portion as being at a first longitudinal position projected onto the longitudinal axis, wherein the body defines the well opening as being at a second longitudinal position projected onto the longitudinal axis, wherein the body defines the container opening as being at a third longitudinal position projected onto the longitudinal axis, and wherein the third longitudinal position is above the first longitudinal position and the second longitudinal position in a longitudinal direction along the longitudinal axis from the bottom wall structure to the receptacle opening, such that the first longitudinal position and the second longitudinal position are both between the bottom wall structure and the third longitudinal position.

2. The sampling device according to claim 1, wherein the body defines the well opening as being, in a plane perpendicular to the longitudinal axis, between a first, minimum radial distance to the longitudinal axis and a second, maximum radial distance to the longitudinal axis, and the body defines the container opening as being, in the plane, between a third, minimum radial distance to the longitudinal axis and a fourth, maximum radial distance to the longitudinal axis, wherein a first interval defined by the first, minimum radial distance and the second, maximum radial distance has an overlap with a second interval defined by the third, minimum radial distance and the fourth, maximum radial distance.

3. The sampling device according to claim 1, wherein the second opening opens into a top portion of the sample well.

4. The sampling device according to claim 1, further comprising a material in the container.

5. The sampling device according to claim 1, wherein the sample container includes a seal, the seal sealing at least the container.

6. The sampling device according to claim 1, wherein the body further defines an elongate channel, and the sample container includes an elongate sampling element within the elongate channel.

7. The sampling device according to claim 6, wherein the body further defines a second container, and the elongate channel is connected to the second container such that the elongate channel opens into the second container.

8. The sampling device of claim 7, wherein the elongate sampling element extends, in a horizontal plane perpendicular to the longitudinal axis, in a horizontal tray which at least partially defines the elongate channel.

9. A system for handling a sample, the system comprising:

the sampling device according to claim 1;

a rotator configured to rotate the sampling device, around the longitudinal axis; and a dosing apparatus configured to transfer an amount of liquid between the container and the sample well.

10. The system according to claim 9, wherein the dosing apparatus includes a pipette configured to translate along the longitudinal direction that is parallel to the longitudinal axis.

11. A method, the method comprising:

delivering a fluid material to the receptacle of the sampling device according to claim 1;

rotating the sampling device around the longitudinal axis to cause a portion of the fluid material to move from the receptacle and enter the sample well via the sample receiving portion and the liquid passageway to form a sample, such that the liquid impermeable barrier prevents the fluid material that moves from the receptacle and through the sample receiving portion from further entering the container via the container opening from the sample receiving portion; and transferring at least a portion of material between the sample well and the container.

12. The method of claim 11, wherein the transferring includes operating a dosing apparatus to cause a transfer of the portion of material between the sample well and the container.

13. The method of claim 12, wherein the operating the dosing apparatus includes lowering a pipette of the dosing apparatus into one of the sample well or the container and withdrawing the portion of material from the one of the sample well or the container, raising the pipette, rotating the sampling device around the longitudinal axis to bring another one of the sample well or the container into longitudinal alignment with the pipette, and lowering the pipette into the other one of the sample well or the container and delivering the portion of material into the other one of the sample well or the container.

14. The method of claim 12, wherein the delivering the fluid material to the receptacle includes dispensing the fluid material into the receptacle to mix with a separate material in the receptacle.

15. The method of claim 14, wherein the fluid material is an extraction liquid, and the dispensing causes the extraction liquid to extract a component material from the separate material to form a resulting liquid that is an extract and a remainder separate material that is a raffinate, such that the receptacle includes a mixture of the extract and the raffinate, the sample container further includes a filter that covers the sample receiving portion, and the rotating the sampling device around the longitudinal axis causes the mixture to move from the receptacle to the sample container and to be filtered by the filter such that at least a portion of the extract passes through the filter and moves to the sample well through the liquid passageway, and the raffinate is retained in the receptacle by the filter.

16. The method of claim 14, further comprising:

prior to delivering the fluid material to the receptacle, adding the separate material to the receptacle, collocating the sample container with the receptacle, subsequently to adding the separate material to the receptacle, to close the receptacle and assemble the sample device, and placing the sample device in the dosing apparatus.

17. The sampling device of claim 1, wherein the sample container further includes a filter that covers the sample receiving portion and is configured to filter a fluid material passing from the receptacle to the sample well through the sample receiving portion such that the filter separates the fluid material into a filtered material that passes through the filter and moves to the sample well and a separate material that is retained in the receptacle.

18. A sample container adapted for use in a sampling device that includes a receptacle, the receptacle including a side wall structure and a bottom wall structure at a first end of the receptacle, the side wall structure and the bottom wall structure collectively defining an inner material receiving space within the receptacle and a receptacle opening at a second end of the receptacle opposite the first end, the sample container comprising:

a body defining a sample receiving portion configured to be located in liquid communication with the inner material receiving space of the receptacle based on the sample container being collocated with the receptacle, a sample well closer to an outer periphery of the sample container than the sample receiving portion, wherein the sample well has a well opening, a liquid passageway extending from a first opening into the sample receiving portion to a second opening into the well opening, and a container having a container opening, wherein the body includes a portion that is configured to act as a liquid impermeable barrier to prevent liquid entry into the container opening from the sample receiving portion, wherein the body defines the sample receiving portion as being at a first longitudinal position projected onto a longitudinal axis of the sample container, wherein the body defines the well opening as being at a second longitudinal position projected onto the longitudinal axis, wherein the body defines the container opening as being at a third longitudinal position projected onto the longitudinal axis, and wherein the third longitudinal position is above the first longitudinal position and the second longitudinal position in a longitudinal direction along the longitudinal axis from the bottom wall structure to the receptacle opening, such that the first longitudinal position and the second longitudinal position are both between the bottom wall structure and the third longitudinal position.

19. The sample container of claim 18, further comprising:

a filter that covers the sample receiving portion and is configured to filter a fluid material passing through the sample receiving portion.

* * * * *